United States Patent
Okuji et al.

(10) Patent No.: US 10,328,927 B2
(45) Date of Patent: Jun. 25, 2019

(54) DISPLAY DEVICE FOR HYBRID VEHICLE

(71) Applicant: MITSUBISHI JIDOSHA KOGYO KABUSHIKI KAISHA, Tokyo (JP)

(72) Inventors: Takayuki Okuji, Tokyo (JP); Jinichi Ohta, Tokyo (JP); Yuichi Kamei, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/982,583

(22) Filed: May 17, 2018

(65) Prior Publication Data

US 2018/0334035 A1 Nov. 22, 2018

(30) Foreign Application Priority Data

May 18, 2017 (JP) .................................. 2017-099041
Dec. 26, 2017 (JP) .................................. 2017-248790

(51) Int. Cl.
*B60W 20/00* (2016.01)
*B60W 20/20* (2016.01)
*B60K 35/00* (2006.01)
*B60W 10/06* (2006.01)
*B60K 37/06* (2006.01)

(52) U.S. Cl.
CPC .............. *B60W 20/20* (2013.01); *B60K 35/00* (2013.01); *B60W 10/06* (2013.01); *B60W 20/00* (2013.01); *B60K 37/06* (2013.01)

(58) Field of Classification Search
CPC ........... B60W 50/14; B60W 2050/143; B60W 2050/146; B60W 10/06; B60W 20/00; B60W 20/20; B60K 35/00; B60L 2250/16
See application file for complete search history.

(56) References Cited

U.S. PATENT DOCUMENTS

| 9,493,073 B2* | 11/2016 | Limbacher | B60K 37/06 |
| 2009/0125173 A1* | 5/2009 | Komatsu | B60K 6/445 701/22 |
| 2014/0032029 A1 | 1/2014 | Hirasawa et al. | |

(Continued)

FOREIGN PATENT DOCUMENTS

| DE | 10 2011 112 643 A1 | 3/2013 |
| EP | 2 708 399 A1 | 3/2014 |

(Continued)

OTHER PUBLICATIONS

Extended European Search Report dated Sep. 21, 2018 in corresponding European Patent Application No. 18172873.4.

*Primary Examiner* — Van T Trieu (74) *Attorney, Agent, or Firm* — Birch, Stewart, Kolasch & Birch, LLP (57) ABSTRACT

A display device, for a hybrid vehicle for displaying an output relating to traveling of the hybrid vehicle, includes a first region, a second region and a third region. The first region indicates the output in a first mode in which an internal combustion engine is stopped and the vehicle travels using an electric motor. The second region indicates the output in a second mode in which the internal combustion engine is operated to travel. The third region is provided between the first region and the second region and has a display type different from that of the first region and the second region.

10 Claims, 6 Drawing Sheets

(56) References Cited

U.S. PATENT DOCUMENTS

2016/0176413 A1\* 6/2016 Oguri .................... B60W 50/14
                                                         701/22
2017/0015328 A1\* 1/2017 Oguri ................ B60W 50/0097
2017/0203661 A1\* 7/2017 Nishinaka ........... B60L 11/1816

FOREIGN PATENT DOCUMENTS

| FR | 3 013 643 A1 | 5/2015 |
| JP | 2009-143553 A | 7/2009 |
| JP | 2016-1970 A | 1/2016 |

\* cited by examiner

DISPLAY DEVICE FOR HYBRID VEHICLE

CROSS REFERENCE TO RELATED APPLICATIONS

This application is based on Japanese Patent Application (No. 2017-099041) filed on May 18, 2017 and Japanese Patent Application (No. 2017-248790) filed on Dec. 26, 2017, the contents of which are incorporated herein by way of reference.

BACKGROUND

The present invention relates to a display device for a hybrid vehicle including a motor and an engine.

A hybrid vehicle includes a motor and an engine as driving power sources for traveling. The hybrid vehicle includes traveling modes of an EV (Electric Vehicle) mode in which driving wheels are driven only by a motor and an HV (Hybrid Vehicle) in which the driving wheels are driven by a motor and an engine.

An example of related art includes JP-A-2009-143553.

SUMMARY

The invention is to provide a display device for a hybrid vehicle in which a traveling state is easy to understand.

According to the invention, there is provided a display device for a hybrid vehicle for displaying an output relating to traveling of the hybrid vehicle, including:

a first region indicating the output in a first mode in which an internal combustion engine is stopped and the vehicle travels using an electric motor;

a second region indicating the output in a second mode in which the internal combustion engine is operated to travel; and a third region that is provided between the first region and the second region and has a display type different from that of the first region and the second region.

DETAILED DESCRIPTION OF EXEMPLIFIED EMBODIMENTS

A hybrid vehicle travels in an EV mode at the time of a start and then an engine is started according to a situation of a vehicle, and travels in an HV mode. In such a hybrid vehicle, a display device indicates to a driver whether the vehicle travels in the EV mode or in the HV mode. In the above-described JP-A-2009-143553, for example, two pointers are used, one pointer 2 indicates a current rotation speed, and the other drag pointer 5 indicates an arcuate region 6 where it is possible to travel in the EV mode. In a case where the pointer 2 is within a range of the arcuate region 6, the case indicates that the vehicle travels in the EV mode to the driver, and in a case where the pointer 2 is out of the range of the arcuate region 6, the case indicates that the vehicle travels in the HV mode to the driver.

However, for example, when the pointer 2 is positioned in the vicinity of the boundary between the arcuate region 6 formed by the drag pointer 5 and the outside of the arcuate region 6, two pointers 2 and 5 are overlapped, and thus, at a glance, it is difficult for the driver to determine a traveling state, that is, whether the vehicle currently travels in the EV mode or in the HV mode.

The present invention has been made in consideration of the above problems, and an object of the present invention is to provide a display device for a hybrid vehicle in which a traveling state is easy to understand.

Hereinafter, an embodiment of a display device for a hybrid vehicle according to the present invention will be described with reference to FIGS. 1 to 6. Here, the hybrid vehicle will be exemplified, but a plug-in hybrid vehicle in which a drive battery may be charged with a commercial power source from an outside may be used.

First Embodiment

Figure 1:
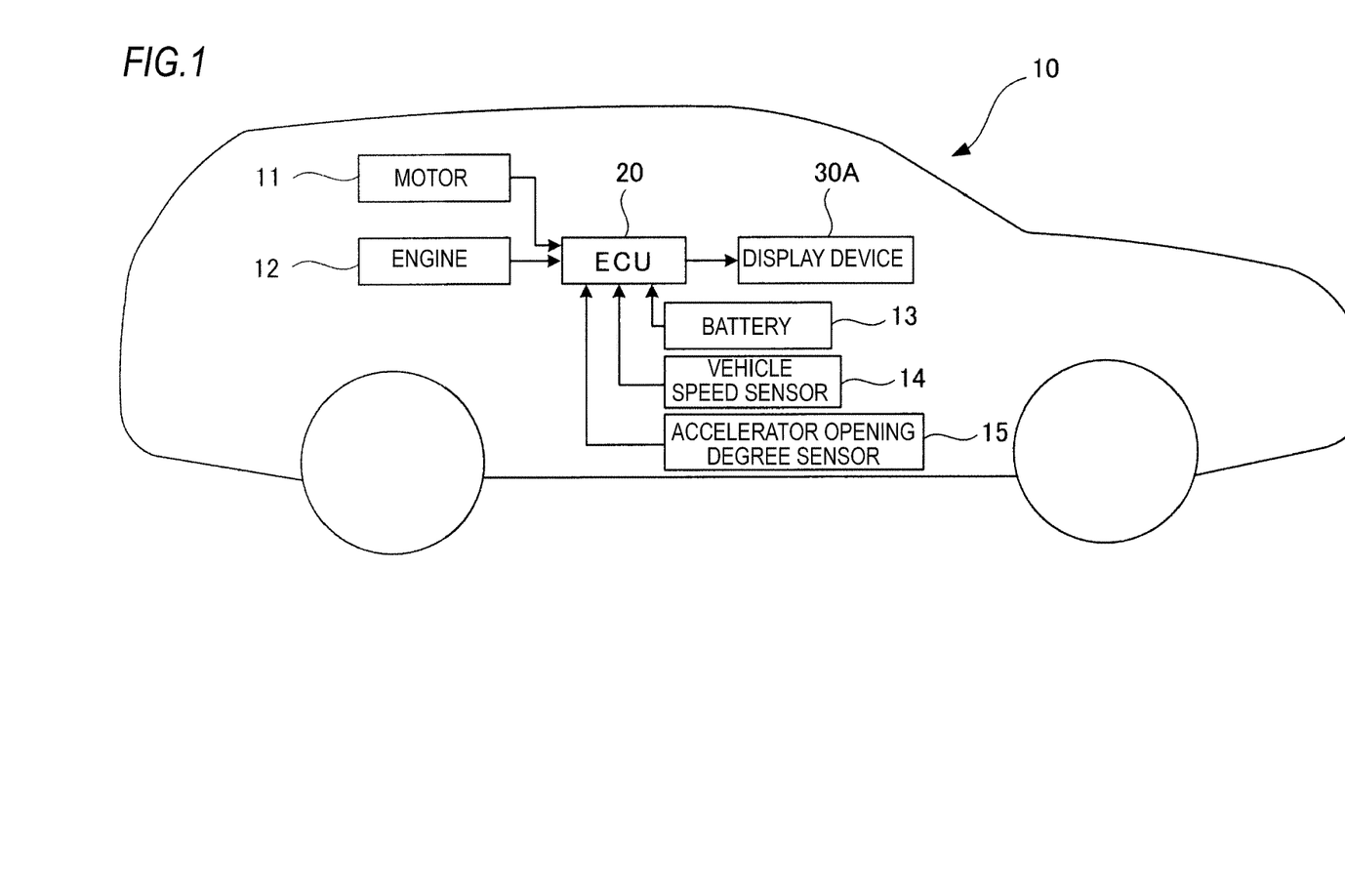
FIG. 1 is a block diagram illustrating a hybrid vehicle.
Figure 2:
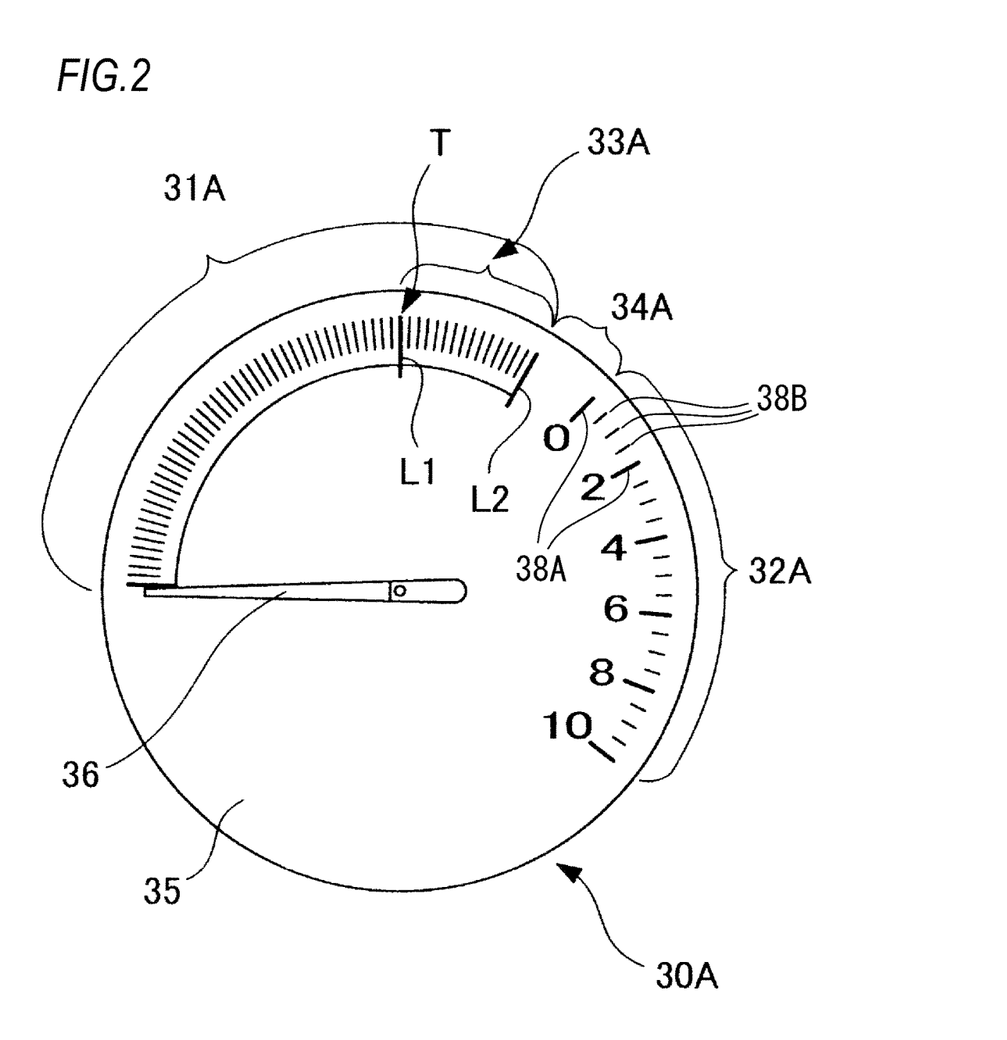
FIG. 2 is a diagram illustrating a display device for the hybrid vehicle according to a first embodiment of the present invention.

FIG. 1 is a block diagram illustrating the hybrid vehicle. FIG. 2 is a diagram illustrating a display device for a hybrid vehicle of the present embodiment.

In the present embodiment, the hybrid vehicle (hereinafter, referred to as a vehicle) 10 includes a motor 11 (electric motor) and an engine 12 (internal combustion engine) as a driving power source for traveling. The motor 11 may be configured to drive a front wheel or a rear wheel, or a plurality of motors 11 may be provided so that the plurality of motors 11 drive the front wheel and the rear wheel, respectively. The engine 12 may also be configured to drive the front wheel or the rear wheel, or may be configured to drive the front wheel and the rear wheel. The vehicle 10 may include a generator (not illustrated) that is driven by the engine 12 and generates electricity.

As a traveling mode of the vehicle, the vehicle 10 has a first mode in which the engine is stopped and a driving wheel is driven using the motor 11 and a second mode in which the engine 12 is operated and the driving wheel is driven by, for example, the motor 11 and the engine 12.

The vehicle 10 includes an Electronics Control Unit (ECU) 20. The ECU 20 includes a Central Processing Unit (CPU), a Random Access Memory (RAM), a Read Only Memory (ROM), an input/output circuit, and the like.

A signal value from the motor 11 or a signal value from the engine 12 is input to the ECU 20. The signal value from the motor 11 includes a motor rotation speed, a motor output, and the like. The signal from the engine 12 includes ON/OFF, an engine rotation speed, an engine output, and the like. A signal value from a drive battery 13 that supplies electric power to the motor 11, a signal value from a vehicle speed sensor 14 that detects a vehicle speed, a signal value from an accelerator opening degree sensor 15 that detects an accelerator opening degree, and the like are also input to the ECU 20. The signal value from the battery 13 includes a State Of Charge (SOC), a battery output, and the like. The ECU 20 performs a calculation process based on the input signal values, and a calculation value obtained by the calculation process is input to the display device 30A.

The display device 30A is a pointer type meter that displays an output (hereinafter referred to as a traveling output) related to a traveling of the vehicle 10 in the first mode and the second mode described above, and is a so-called meter. As the display device 30, a mechanical analog meter, a digital meter including a liquid crystal panel and the like, or the like may be used.

As illustrated in FIG. 2, the display device 30A includes a circular instrument panel 35 (display region) in which a first region 31A and a second region 32A are disposed and a third region 34A is disposed, and one pointer 36 that is provided so as to be rotatable on the instrument panel 35. The first region 31A includes a fourth region 33A. The pointer 36 indicates a position corresponding to the calculation value input from the ECU 20. The traveling output of the vehicle 10 in the first mode and the second mode is displayed by one needle of the pointer 36.

The first region 31A is an operation region when the engine 12 is stopped and the vehicle travels using the motor 11, that is, an operation region of the pointer 36 in the first mode. The first region 31A is a scale region indicating the traveling output in the first mode. In a case where it is assumed that the position of 12 o'clock (an uppermost position T of the instrument panel 35) is 0°=360° at an outer periphery on the instrument panel 35, the first region 31A is disposed in a fan shape or an arc shape from about 270° to about 30° (from 9 o'clock to 1 o'clock). A region excluding the fourth region 33A in the first region 31A is disposed in a fan shape or an arc shape from about 270° to 0° (from 9 o'clock to 12 o'clock). A division line L1 is disposed at a position of 0° (12 o'clock). The division line L1 indicates a limit position at which there is no possibility of the starting of the engine 12 in the first mode. In the following description, as an expression of an azimuth, either or both of a time of a clock and an angle at which the position of 12 o'clock is 0° (=360°) is used.

A scale of the region excluding the fourth region 33A in the first region 31A indicates the traveling output in the first mode. The pointer 36 indicates a position corresponding to the traveling output in the position from 9 o'clock to 12 o'clock. For example, as the "traveling output in the first mode", the battery output of the battery 13, the vehicle speed detected by the vehicle speed sensor 14, the accelerator opening degree detected by the accelerator opening degree sensor 15, the motor rotation speed of the motor, the motor output, and the like may be used.

The traveling output in the first mode described above may be selected by the driver. For example, a selection switch (not illustrated) may be provided on the display device 30A and enable the driver to select one traveling output among the traveling outputs described above by operating the selection switch.

For example, in a case where the battery output is selected, the battery output of the limit at which it is impossible to start the engine 12 is the division line L1, and the pointer 36 indicates a position of a current battery output. In a case where the vehicle speed is selected, the vehicle speed of a limit at which it is impossible to start the engine 12 is the division line L1, and the pointer 36 indicates a position of a current vehicle speed. In a case where the accelerator opening degree is selected, the accelerator opening degree of a limit at which it is impossible to start the engine 12 is the division line L1, and the pointer 36 indicates a position of a current accelerator opening degree. In a case where an output margin of the battery 13 in a second embodiment which will be described later is selected as an integrated traveling output, the limit margin where there is no possibility of the start of the engine 12 is the division line L1, and the pointer 36 indicates a position of a current margin.

The fourth region 33A is an operation region of the pointer 36 when a plurality of conditions for starting the engine 12 are established and a possibility in which the engine 12 is started increases, that is, there is a possibility of a switch from the first mode to the second mode. The fourth region 33A is the scale region indicating the traveling output, where there is a possibility of the start of the engine 12. The fourth region 33A is disposed in a fan shape or an arc shape in a position from 0° to about 30° (from the position of 12 o'clock, that is, the uppermost position T to the position of one o'clock) in the outer periphery on the instrument panel 35. A division line L2 is disposed at a position of about 30° (1 o'clock). The division line L2 indicates a position at which the engine 12 starts in a case where the pointer passes the division line L2. The fourth region 33A is disposed in a position adjacent to the third region 34A in a counterclockwise direction.

A scale of the fourth region 33A is also a scale indicating the traveling output in the first mode. The scale indicates a traveling output exceeding the traveling output within the range of the region excluding the fourth region 33A in the first region 31A, that is the traveling output exceeding the division line L1. The pointer 36 indicates the position corresponding to the traveling output in the position from 12 o'clock to 1 o'clock.

In the fourth region 33A, as described above, there is a possibility of the start of the engine 12, however, the traveling output at the time of the start varies and has a range according to a situation. For example, a movement of the pointer 36 depends on a maximum output of the drive battery 13. The maximum output increases in a case where a charge is performed by regeneration or the like and is reduced according to an elapsed time in a case where a discharge state continues. Due to such a change of the maximum output, the position of the pointer 36 at the time of the start of the engine 12 may be changed. The fourth region 33A is provided with a predetermined width (here, a width of an angle of 30°) in a circumferential direction in order to absorb a range of the traveling output where there is the possibility of the start of the engine 12. The predetermined width of the fourth region 33A corresponds to the range of the traveling output where there is the possibility of the start.

The fourth region 33A is provided as described above, and thus it is possible to indicate the mode in which there is the possibility of the start of the engine 12 by the fourth region 33A. That is, the engine 12 starts at an arbitrary position in the fourth region 33A regardless of a predetermined condition such as the maximum output of the battery. As a result, it is easy to understand a traveling state of the vehicle 10, the driver can correctly grasp the traveling output, and it is easy to realize an intended driving. The first region 31A including the fourth region 33A is disposed in a predetermined range and does not change differently from the arcuate region 6 disclosed in Patent Document 1. Therefore, it is possible to easily understand the traveling state of the vehicle 10.

A plurality of main scales 38A in the circumferential direction and a plurality of sub scales 38B provided between the main scales 38A adjacent to each other are indicated in the second region 32A. The main scales 38A are thicker and longer than the sub scales 38B. In addition, the indication of the main scales 38A is not limited in the invention, as long as it is possible to differentiate from the indication of the sub scales 38B. For example, each of the main scales 38A may be a line which is longer than the sub scales 38B with the same thickness as the sub scales 38B, or be a line which is thicker than the sub scales 38B with the same length as the sub scales 38B. The main scales 38A may have a color different from a color of the sub scales 38B. In the case that the main scales 38A have the color different from the color of the sub scales 38B, the thickness and the length may be equal to each other or be different from each other between the main scales 38A and the sub scales 38B respectively.

The width in the circumferential direction of the third region 33A is different from a width in a circumferential direction of one span of the main scale 38A in the second region 32A. The width in the circumferential direction of the third region 33A is wider than the width in the circumferential direction of the one span of the main scale 38A in the second region 32A. The width in the circumferential direction of the third region 33A is set to a range of 30° or more. In the second region 32A, the width in the circumferential direction of the one span of the main scale 38A is a width between adjacent main scales 38A indicated by thick and long lines. Here, since a scale (hereinafter, referred to as a scale number) is marked with a number, in a case where the description is given using the scale number, for example, the width is a width between a main scale 38A of a scale number "0" and a main scale 38A of a scale number "2". Therefore, it is possible to appropriately secure the range of the possibility of the start of the engine 12 and not to give any discomfort related to the movement of the pointer 36 in a corresponding region to the driver.

A starting point of the fourth region 33A is disposed at a position of 12 o'clock (the uppermost position T of the instrument panel 35) and the fourth region 33A is disposed on a right side from the position of 12 o'clock. That is, the fourth region 33A is provided on the same side as the second region 32A indicating the second mode using 12 o'clock as a boundary. Therefore, on the right side of 12 o'clock, the driver can feel that the engine 12 is started or operated, and can easily grasp the vehicle state, whereby operability is also improved.

The second region 32A is an operation region of the pointer 36 when the engine 12 is started and the vehicle travels, that is, operation region of the pointer 36 in the second mode. The second region 32A is a scale region indicating the traveling output in the second mode. The second region 32A is disposed in a fan shape or an arc shape in a position from about 45° to about 130° in the outer periphery on the instrument panel 35. As described above, the second region 32A is also disposed in a predetermined range that is determined in advance. The second region 32A includes a plurality of main scales 38A (thick and long lines) and a plurality of sub scales 38B (thin and short lines) disposed between the main scales 38A.

A scale of the second region 32A indicates the traveling output in the second mode. The pointer 36 indicates a position corresponding to the traveling output in the position from about 45° to about 130°. For example, as the "traveling output in the second mode", the engine rotation speed, the engine output, or the like of the engine 12 may be used. A traveling output related to the motor 11 may be included, and in this case, a sum output of the motor output and the engine output, a shaft output of a drive shaft of the vehicle 10, or the like may be used.

The traveling output in the second mode described above may also be selected by the driver. For example, another selection switch (not illustrated) may be provided on the display device 30A and enable the driver to select one traveling output among the traveling outputs described above by operating the selection switch.

For example, in a case where the engine rotation speed is selected, the pointer 36 indicates a position of a current engine rotation speed. In a case where the engine output is selected, the pointer 36 indicates a position of a current engine output. In a case where the sum output is selected, the pointer 36 indicates a position of a current sum output. In a case where the shaft output is selected, the pointer 36 indicates a position of a current shaft output.

The scale of the second region 32A is marked with a scale number. A position of about 45° is marked with "0", the scale number increases clockwise, and a position of about 130° is marked with "10". In the first region 31A including the fourth region 33A, the scale number is not marked. Since the scale number is not marked in the first region 31A, the scale may not be marked. For example, only arc may be displayed in the first region 31A.

As described above, since the scale number is marked in any one of the first region 31A and the second region 32A, the driver can easily understand that the first region 31A and the second region 32A are meters indicating different traveling outputs. As a result, it is possible to easily grasp the traveling state of the vehicle 10. Since the scale number is marked in the second region 32A, the traveling output in the second mode, that is, the traveling output related to the engine output can be checked by a number. Therefore, it is possible to promote awareness of eco driving to the driver.

A starting point (the position of the scale number of "0") of the second region 32A is disposed on the right side from the position of 12 o'clock, and the width in the circumferential direction of the second region 32A indicating the second mode is set to be seen narrowly than the width in the circumferential direction of the first region 31A including the fourth region 33A, thereby promoting the awareness of the eco driving to the driver.

The third region 34A has a display type different from that of the first region 31A and the second region 32A. Here, the third region 34A is a blank region where scales are not displayed in the region, as in the first region 31A and the second region 32A. The third region 34A is a region provided for clearly distinguishing the first region 31A and the second region 32A in the circumferential direction. The third region 34A is provided between the second region 32A and the fourth region 33A in the first region 31A. The third region 34A is disposed from about 30° to about 45° that is a range within 45° from the position of 12 o'clock.

When the third region 34A is set to be blank as in the present embodiment, the first region 31A and the second region 32A can be more clearly divided in the circumferential direction, so that the driver can easily recognize the current traveling state. As a result, it is also possible promote awareness of eco driving to the driver. The third region 34A may have a display type different from that of other regions 31A and 32A. That is, for example, only the third region 34A may be colored, or may be attached with a specific pattern.

As described above, when the third region 34A is disposed, the third region 34A serves as a divider, and thus the driver can easily understand that right and left regions (the first region 31A and the second region 32A) divided by the third region 34A as a boundary are meters indicate different traveling outputs. Therefore, it is possible to easily grasp the traveling state of the vehicle 10. Furthermore, when the third region 34A is disposed in the range of 45° from the position of 12 o'clock (uppermost position T), it is possible to appropriately secure the display range of each of the first region 31A and the second region 32A. That is, for example, it is possible to prevent the second region 32A from being extremely narrower or wider than another region (first region 31A).

A width in a circumferential direction of the third region 34A is different from the width in the circumferential direction of the one span of the main scale 38A in the second region 32A. The width in the circumferential direction of the third region 34A is narrower than the width in the circumferential direction of the one span of the main scale 38A in the second region 32A. The width in the circumferential direction of the third region 34A is different from the width in the circumferential direction of the fourth region 33A. The width in the circumferential direction of the third region 34A is narrower than the width in the circumferential direction of the fourth region 33A. Therefore, it is possible to effectively utilize a space of the instrument panel 35 and to prevent the third region 34A from being erroneously recognized as a part of the second region 32A or the fourth region 33A.

The division line L1 described above divides the region excluding the fourth region 33A and the fourth region 33A in the first region 31A. The division line L2 and the third region 34A described above divide the first region 31A and the second region 32A and divide the fourth region 33A and the second region 32A. Therefore, the first region 31A and the second region 32A are displayed independently from each other. For clearer division, colors for displaying the region excluding the fourth region 33A in the first region 31A, the fourth region 33A, and the second region 32A may be different from each other. For example, in a case where the region excluding the fourth region 33A in the first region 31A is set to green, the fourth region 33A is set to yellow, and the second region 32A is set to red, it is possible to promote the awareness of the eco driving to the driver.

Each of the first region 31A and the second region 32A is disposed in a fan shape or an arc shape in a predetermined range. That is, the first region 31A and the second region 32A are disposed in a similar fan shape or arc shape in a predetermined range. The first region 31A and the second region 32A are also in a fan shape or an arc shape as a whole.

The movement of the pointer 36 according to the driving operation of the vehicle 10 will be described with respect to the display device 30A having the configuration described above.

In a case where the driver starts the vehicle 10, the vehicle 10 first starts the traveling in the first mode. During the traveling output in which the engine 12 is not started, the pointer 36 shifts in the range of the region excluding the fourth region 33A in the first region 31A according to the traveling output in the first mode.

In a case where the traveling output in the first mode is the traveling output exceeding the division line L1, the pointer 36 shifts in the range of the fourth region 33A according to the traveling output in the first mode until the engine 12 starts. In a case where the traveling output in the first output exceeds, for example, the maximum output of the battery 13, the engine 12 is started.

In a case where the engine 12 is started, the pointer 36 rapidly moves from the fourth region 33A to the second region 32A, and shifts within the range of the second region 32A according to the traveling output in the second mode. At this time, the pointer 36 may move to the position of the scale number of "0" that is the starting point of the second region 32A, may stop, and then may move to the position corresponding to the traveling output in the second mode. Therefore, it is possible to indicate that the mode is shifted from the first mode to the second mode, that is, the engine 12 is started, to the driver. Then, the pointer 36 shifts within the range of the second region 32A until the engine 12 stops.

As described above, since the display device 30A is provided with the third region 34A (blank region) between the first region 31A indicating the first mode and the second region 32A indicating the second mode, the first region 31A and the second region 32A are divided from each other by the third region 34A, whereby the driver can easily understand that the first region 31A and the second region 32A are meters indicating different traveling outputs with the third region 34A as a boundary.

In addition, the display device 30A can indicate the first mode when the engine 12 is not be started in the first region 31A (in particular, the region excluding the fourth region 33A), and it is possible to clearly indicate that the vehicle may travel in the first mode to the driver. Therefore, the driver can continue the traveling in the first mode with an easy mind.

Since a request output when there is the possibility of the start of the engine 12 is indicated in the fourth region 33A, it is possible to clearly indicate a range in which there is the possibility of the start of the engine 12 to the driver. In the related art, since a display of a timing at which the engine is started is a pinpoint and is changed, the engine may be started even though the driver does not intend to start the engine in some cases. On the other hand, in the present embodiment, since the fourth region 33A is indicated as the range in which there is the possibility of the start of the engine 12, the driver can grasp the positional relationship between the fourth region 33A and the pointer 36 and perform an operation of the vehicle 10. For example, in a case where the driver does not desire to start the engine 12, an operation may be performed by operating the accelerator opening degree or the like so that the pointer 36 returns to the range of the region excluding the fourth region 33A in the first region 31A.

In a case where the engine 12 is started, since the pointer 36 moves from the fourth region 33A to the second region 32A, the driver can recognize that the engine 12 is operated.

With the display device 30A of such a configuration, it is easy to understand the traveling state of the vehicle, the driver can correctly grasp the traveling state, and an intended driving becomes easy.

Second Embodiment

Figure 3:
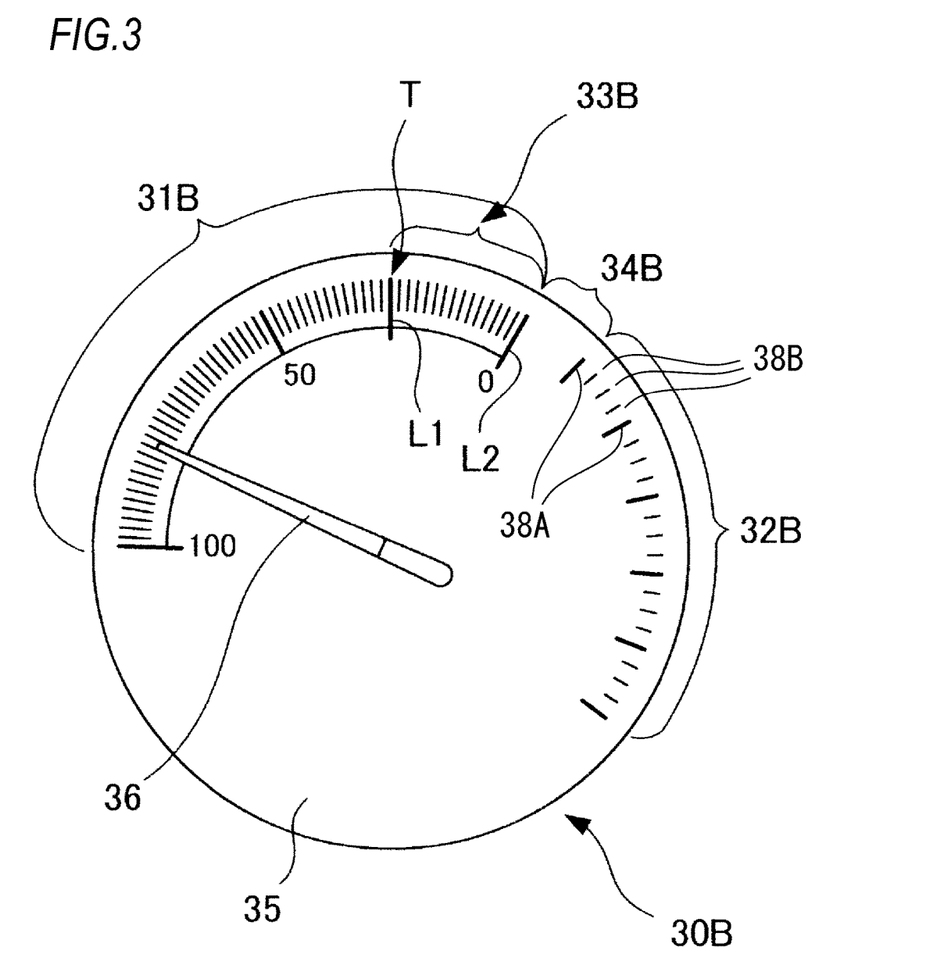
FIG. 3 is a diagram illustrating a display device for the hybrid vehicle according to a second embodiment of the present invention.

FIG. 3 is a diagram illustrating a display device for a hybrid vehicle.

A display device 30B of the present embodiment is also an instrument (meter) for displaying a traveling output of a hybrid vehicle in a first mode and a second mode and is applicable to the vehicle 10 illustrated in FIG. 1 instead of the display device 30A described in the first embodiment. A configuration of the vehicle 10 is as described in the first embodiment, and the description thereof will not be presented.

The display device 30B also includes an instrument panel 35, on which a first region 31B (including a fourth region 33B) and a second region 32B are disposed and a third region 34B is disposed, and one pointer 36. Since the instrument panel 35 and the pointer 36 may be the same as those described in the first embodiment, the same reference numerals are given here and the duplicated description will not be presented.

In the present embodiment, the first region 31B, the second region 32B, the fourth region 33B, and the third region 34B in the display device 30B have the same configuration as the first region 31A, the second region 32A, the fourth region 33A, and the third region 34A in the display device 30A of the first embodiment except for the difference in arrangement position of scale numbers.

Therefore, unless otherwise particularly specified in the present embodiment, it is interpreted that the first region 31B, the second region 32B, the fourth region 33B, and the third region 34B in the display device 30B perform respectively the same functions and effects as the first region 31A, the second region 32A, the fourth region 33A, and the third region 34A in the display device 30A of the first embodiment. In the following description, therefore, the duplicated description will not be presented and differences from the first embodiment will be described.

In the present embodiment, scales of the first region 31B including the fourth region 33B are marked with scale numbers, a position of 9 o'clock (about 270°) is marked with "100", and a position of one o'clock (about 30°) is marked with "0" as the scale numbers becomes small in the clockwise direction. In the present embodiment, an output margin of the battery 13 is used as the "traveling output in the first mode", and the unit of the scale numbers is in %. Such a margin may be calculated by an ECU 20 based on an SOC of the battery 13, a vehicle speed detected by a vehicle speed sensor 14, an accelerator opening degree detected by an accelerator opening degree sensor 15, a rotation speed of a motor 11, and a motor output. Here, a division line L2 indicates a position of the margin of 0% where the engine 12 is necessarily started. A division line L1 indicates a position of a limit margin (for example, 25%) where there is no possibility of the start of the engine 12.

In the present embodiment, the scales of the first region 31B are marked with the scale numbers as described above, but scales of the second region 32B are not marked with scale numbers. Since the second region 32B is not marked with the scale numbers, the scales may not be marked. For example, only an arc shape the second region 32B may be displayed.

As described above, since either of the first region 31B or the second region 32B is marked with the scale numbers, the driver can easily understand that the meter indicates different traveling outputs from first region 31B and the second region 32B.

Third Embodiment

Figure 4:
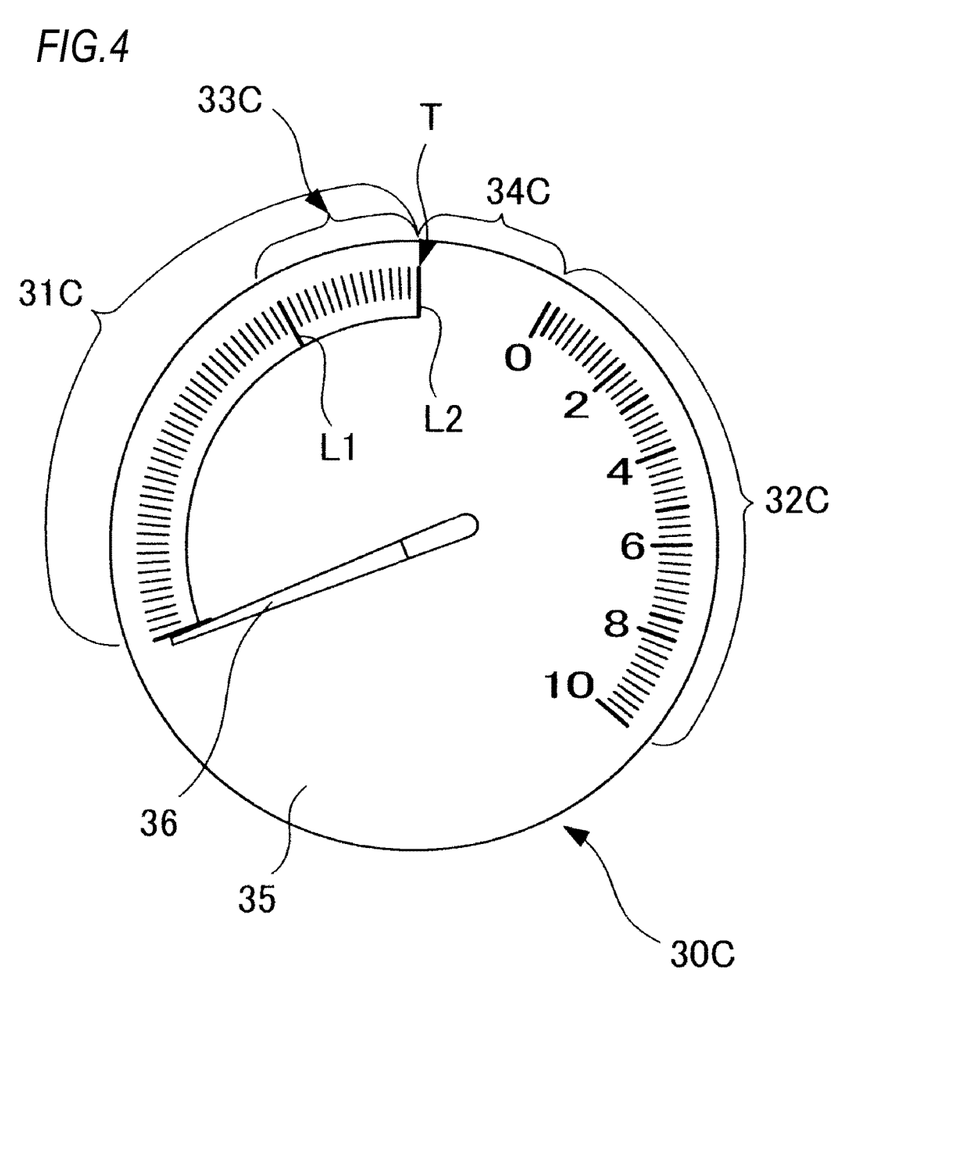
FIG. 4 is a diagram illustrating a display device for the hybrid vehicle according to a third embodiment of the present invention.

FIG. 4 is a diagram illustrating a display device for a hybrid vehicle.

A display device 30C of the present embodiment is also an instrument (meter) for displaying a traveling output of a hybrid vehicle in a first mode and a second mode and is applicable to the vehicle 10 illustrated in FIG. 1 instead of the display device 30A described in the first embodiment. A configuration of the vehicle 10 is as described in the first embodiment, and the description thereof will not be presented.

The display device 30C also includes an instrument panel 35, on which a first region 31C (including a fourth region 33C) and a second region 32C are disposed and a third region 34C is disposed, and one pointer 36. Since the instrument panel 35 and the pointer 36 may be the same as those described in the first embodiment, the same reference numerals are given here and the duplicated description will not be presented.

In the present embodiment, the first region 31C, the second region 32C, the fourth region 33C, and the third region 34C in the display device 30C have the same configuration as the first region 31A, the second region 32A, the fourth region 33A, and the third region 34A in the display device 30A of the first embodiment except for the difference in arrangement range.

Therefore, unless otherwise particularly specified in the present embodiment, it is interpreted that the first region 31C, the second region 32C, the fourth region 33C, and the third region 34C in the display device 30C perform respectively the same functions and effects as the first region 31A, the second region 32A, the fourth region 33A, and the third region 34A in the display device 30A of the first embodiment. In the following description, therefore, the duplicated description will not be presented and differences from the first embodiment will be described.

The first region 31C has the same configuration as the first region 31A in the first embodiment except for the difference in arrangement range. Here, the first region 31C is disposed from about 240° to 0° (from 8 o'clock to 12 o'clock) at an outer periphery on the instrument panel 35. A region excluding the fourth region 33C in the first region 31C is disposed from about 240° to about 330°. In addition, a division line L1 is disposed at a position of about 330° (11 o'clock).

The fourth region 33C also has the same configuration as the fourth region 33A in the first embodiment except for the difference in arrangement range. Here, the fourth region 33C is disposed from about 330° to 0° (from 11 o'clock to 12 o'clock) at the outer periphery on the instrument panel 35. In addition, a division line L2 is disposed at a position of 0° (12 o'clock).

The second region 32C also has the same configuration as the second region 32A in the first embodiment except for the difference in arrangement range. Here, the second region 32C is disposed from about 30° to 130° at the outer periphery on the instrument panel 35.

As described above, the fourth region 33C is disposed on the left side from the position of 12 o'clock. The first region 31C indicating the first mode includes the fourth region 33C, and is disposed on the left side from the position of 12 o'clock. On the other hand, the second region 32C indicating the second mode is disposed on the right side from the position of 12 o'clock. For this reason, on the right side from the position of 12 o'clock, the driver can feel that the engine 12 is fully operating.

The third region 34C also has the same configuration as the third region 34A in the first embodiment except for the difference in arrangement range. Here, the third region 34C is disposed from about 0° to about 30° (from 12 o'clock to one o'clock).

In the present embodiment, a width in a circumferential direction of the third region 34C is equal to a width in the circumferential direction of the fourth region 33C. The width in the circumferential direction of the third region 34C is different from a width in the circumferential direction of one span of a main scale in the second region 32C. The width in the circumferential direction of the third region 34C is wider than the width in the circumferential direction of one span of the main scale in the second region 32C. Thus, it is possible to prevent the third region 34C from being erroneously recognized as a part of the second region 32C, and it is possible to further clearly distinguish the first region 31C and the fourth region 33C from the second region 32C.

In the present embodiment, as in the second embodiment (see the display device 30B illustrated in FIG. 3), the first region 31C including the fourth region 33C may also be marked with scale numbers instead of the scale numbers of the second region 32C. For example, similarly to the display device 30B, when being marked with the margin (%), the position of the division line L2 is marked with "0" and the starting position (position of about 240°) of the first region 31C is marked with "100". Further, the region not marked with the scale numbers may not be marked with scales, for example, may be displayed in an arc shape.

Fourth Embodiment

Figure 5:
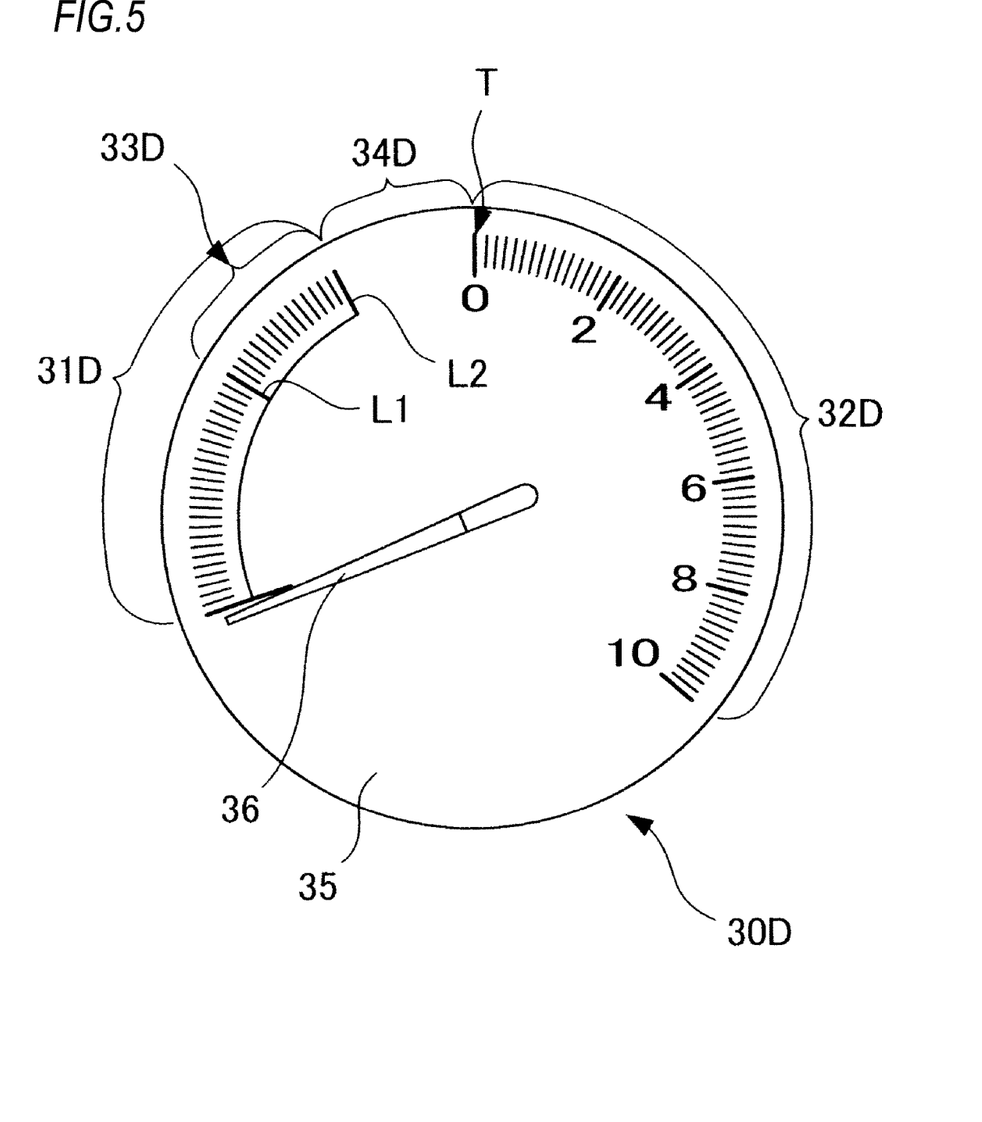
FIG. 5 is a diagram illustrating a display device for the hybrid vehicle according to a fourth embodiment of the present invention.

FIG. 5 is a diagram illustrating a display device for a hybrid vehicle.

A display device 30D of the present embodiment is also an instrument (meter) for displaying a traveling output of a hybrid vehicle in a first mode and a second mode and is applicable to the vehicle 10 illustrated in FIG. 1 instead of the display device 30A described in the first embodiment. A configuration of the vehicle 10 is as described in the first embodiment, and the description thereof will not be presented.

The display device 30D also includes an instrument panel 35, on which a first region 31D (including a fourth region 33D) and a second region 32D are disposed and a third region 34D is disposed, and one pointer 36. Since the instrument panel 35 and the pointer 36 may be the same as those described in the first embodiment, the same reference numerals are given here and the duplicated description will not be presented.

In the present embodiment, the first region 31D, the second region 32D, the fourth region 33D, and the third region 34D in the display device 30D have the same configuration as the first region 31A, the second region 32A, the fourth region 33A, and the third region 34A in the display device 30A of the first embodiment except for the difference in arrangement range.

Therefore, unless otherwise particularly specified in the present embodiment, it is interpreted that the first region 31D, the second region 32D, the fourth region 33D, and the third region 34D in the display device 30D perform respectively the same functions and effects as the first region 31A, the second region 32A, the fourth region 33A, and the third region 34A in the display device 30A of the first embodiment. In the following description, therefore, the duplicated description will not be presented and differences from the first embodiment will be described.

The first region 31D has the same configuration as the first region 31A in the first embodiment except for the difference in arrangement range. Here, the first region 31D is disposed from about 240° to about 330° (from 8 o'clock to 11 o'clock) at an outer periphery on the instrument panel 35. A region excluding the fourth region 33D in the first region 31D is disposed from about 240° to about 300°. In addition, a division line L1 is disposed at a position of about 300° (10 o'clock).

The fourth region 33D also has the same configuration as the fourth region 33A in the first embodiment except for the difference in arrangement range. Here, the fourth region 33D is disposed from about 300° to about 330° (from 10 o'clock to 11 o'clock) at the outer periphery on the instrument panel 35. In addition, a division line L2 is disposed at a position of about 330° (11 o'clock).

The second region 32D also has the same configuration as the second region 32A in the first embodiment except for the difference in arrangement range. Here, the second region 32D is disposed from 0° to about 130° at the outer periphery on the instrument panel 35. The position of 12 o'clock (uppermost position T) is marked with the scale number of "0", which is a starting point of the second region 32D. A width in a circumferential direction of the second region 32D is wider than a width in the circumferential direction of the first region 31D including the fourth region 33D.

As described above, the fourth region 33D is disposed on the left side from the position of 12 o'clock. The first region 31D indicating the first mode includes the fourth region 33D, and is disposed on the left side from the position of 12 o'clock. On the other hand, the second region 32D indicating the second mode is disposed on the right side from the position of 12 o'clock. For this reason, on the right side from the position of 12 o'clock, the driver can feel that the engine 12 is operating.

The third region 34D also has the same configuration as the third region 34A in the first embodiment except for the difference in arrangement range. Here, the third region 34D is disposed from about 330° to 0° (from 11 o'clock to 12 o'clock).

In the present embodiment, a width in a circumferential direction of the third region 34D is equal to a width in the circumferential direction of the fourth region 33D. The width in the circumferential direction of the third region 34D is different from a width in the circumferential direction of one span of the main scale in the second region 32D. The width in the circumferential direction of the third region 34D is narrower than the width in the circumferential direction of one span of the main scale in the second region 32D. Therefore, it is possible to prevent the third region 34D from being erroneously recognized as a part of the second region 32C, and it is possible to further clearly distinguish between the first region 31D and the second region 32D.

In the present embodiment, as in the second embodiment (see the display device 30B illustrated in FIG. 3), the first region 31D including the fourth region 33D may also be marked with scale numbers instead of the scale numbers of the second region 32D. For example, similarly to the display device 30B, when being marked with the margin (%), the position of the division line L2 is marked with "0" and the starting position (position of about 240°) of the first region 31D is marked with "100". Further, the region not marked with the scale numbers may not be marked with scales, for example, may be displayed in an arc shape.

Fifth Embodiment

Figure 6:
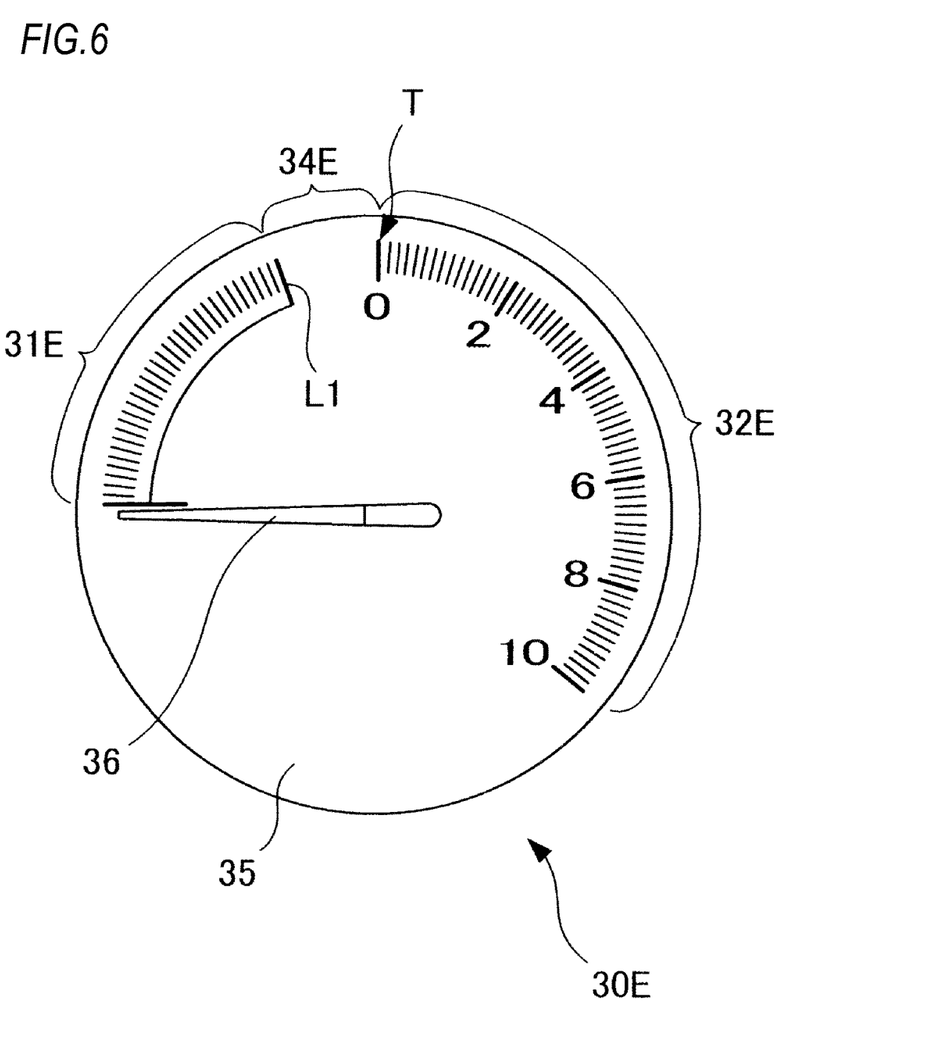
FIG. 6 is a diagram illustrating a display device for the hybrid vehicle according to a fifth embodiment of the present invention.

FIG. 6 is a diagram illustrating a display device for a hybrid vehicle.

A display device 30E of the present embodiment is also an instrument (meter) for displaying a traveling output of a hybrid vehicle in a first mode and a second mode and is applicable to the vehicle 10 illustrated in FIG. 1 instead of the display device 30A described in the first embodiment. A configuration of the vehicle 10 is as described in the first embodiment, and the description thereof will not be presented.

The display device 30E also includes an instrument panel 35, on which a first region 31E and a second region 32E are disposed and a third region 34E is disposed, and one pointer 36. Since the instrument panel 35 and the pointer 36 may be the same as those described in the first embodiment, the same reference numerals are given here and the duplicated description will not be presented.

In the present embodiment, the second region 32E and the third region 34E in the display device 30E have the same configuration as the second region 32A and the third region 34A in the display device 30A of the first embodiment except for the difference in arrangement range. On the other hand, a region corresponding to the fourth region 33A in the display device 30A of the first embodiment is not provided in the present embodiment.

Therefore, unless otherwise particularly specified in the present embodiment, it is interpreted that the second region 32E and the third region 34E in the display device 30E perform respectively the same functions and effects as the second region 32A and the third region 34A in the display device 30A of the first embodiment. In the following description, therefore, the duplicated description will not be presented and differences from the first embodiment will be described.

The first region 31E corresponds to a region excluding the fourth region 33A in the first region 31A of the first embodiment, and has the same configuration as the region excluding the fourth region 33A in the first region 31A of the first embodiment except for the difference in arrangement range. Here, the first region 31E is disposed from about 270° to about 340° at an outer periphery on the instrument panel 35. In addition, a division line L1 is disposed at a position of about 340°.

In the present embodiment, the region corresponding to the fourth region 33A described above is not provided. For this reason, no division line L2 is provided. In the present embodiment, as described above, the fourth region 33A and the division line L2 are not provided, but the division line L1 performs a function corresponding to the fourth region 33A and the division line L2.

That is, the division line L1 indicates the operating position when the engine 12 is possibly started in the first mode, that is, there is a possibility of switching to the second mode, and indicates the position at which the engine 12 is possibly started. For this reason, when the traveling output in the first mode exceeds the traveling output within the first region 31E, the pointer 36 is stopped at the position of the division line L1 until the engine 12 is started. In this way, the division line L1 performs the function corresponding to the fourth region 33A and the division line L2.

The second region 32E also has the same configuration as the second region 32A in the first embodiment except for the difference in arrangement range. Here, the second region 32E is disposed from 0° to 130° at the outer periphery on the instrument panel 35. The position of 12 o'clock (uppermost position T) is also marked with the scale number of "0", which is a starting point of the second region 32E. A width in a circumferential direction of the second region 32E is wider than a width in the circumferential direction of the first region 31E.

As described above, the first region 31E indicating the first mode is disposed on the left side from the position of 12 o'clock (uppermost position). On the other hand, the second region 32E indicating the second mode is disposed on the right side from the position of 12 o'clock (uppermost position). For this reason, on the right side from the position of 12 o'clock, the driver can feel that the engine 12 is operating.

The third region 34E also has the same configuration as the third region 34A in the first embodiment except for the difference in arrangement range. Here, the third region 34E is disposed from about 340° to 0° which is a range within 45° from the position of 12 o'clock.

In the present embodiment, a width in a circumferential direction of the third region 34E is different from a width in the circumferential direction of one span of a main scale in the second region 32E. The width in the circumferential direction of the third region 34E is narrower than the width in the circumferential direction of one span of a main scale in the second region 32E. Thus, it is possible to effectively utilize a space of the instrument panel 35 and to prevent the third region 34E from being erroneously recognized as a part of the first region 31E or the second region 32E.

Here, the movement of the pointer 36 in the display device 30E associated with the driving operation of the vehicle 10 will be described.

In a case where the driver starts the vehicle 10, the vehicle 10 first starts the traveling in the first mode. During the traveling output in which the engine 12 is not started, the pointer 36 shifts in the range of the first region 31E according to the traveling output in the first mode.

In a case where the traveling output in the first mode is the traveling output exceeding the division line L1, the pointer 36 stops at the position of the division line L1 until the engine 12 starts. In a case where the traveling output in the first output exceeds, for example, the maximum output of the battery 13, the engine 12 is started.

In a case where the engine 12 is started, the pointer 36 is skipped from the position of the division line L1 to the second region 32E, and shifts within the range of the second region 32E according to the traveling output in the second mode. At this time, the pointer 36 may move to the position of the scale number of "0" in the second region 32E, may stop, and then may move to the position corresponding to the traveling output in the second mode. Therefore, it is possible to indicate that the mode is shifted from the first mode to the second mode, that is, the engine 12 is started, to the driver. Then, the pointer 36 shifts within the range of the second region 32E until the engine 12 stops.

In the present embodiment, as in the second embodiment (see the display device 30B illustrated in FIG. 3), the first region 31E may also be marked with scale numbers instead of the scale numbers of the second region 32E. For example, similarly to the display device 30B, when being marked with the margin (%), the position of the division line L1 is marked with "0" and the starting position (position of about 270°) of the first region 31E is marked with "100". Further, the region not marked with the scale numbers may not be marked with scales, for example, may be displayed in an arc shape.

Modification

In the first to fifth embodiments, the second mode is defined as a mode in which the engine 12 is operated and the driving wheel is driven by, for example, the motor 11 and the engine 12, but is not limited thereto. That is, the second mode may be either a traveling mode in which the engine 12 is driven and used as a power supply source of the motor 11 or a traveling mode in which each wheel of the vehicle 10 is driven by the driving force of only the engine 12.

In the first to fifth embodiments, the plurality of regions are disposed in the fan shape or the arc shape on the circular instrument panel 35, but are not limited to such a shape as long as the plurality of regions can be marked. For example, the plurality of regions may be disposed in a rectangular shape on a rectangular instrument panel.

Further, the first region, the second region, the third region, and the fourth region in the first to fifth embodiments may be disposed symmetrically with respect to the arrangement illustrated in FIGS. 2 to 6 based on a virtual line connecting the uppermost position T of the display region (instrument panel 35) and the center point of the display region (instrument panel 35).

In the first to fifth embodiments, a regenerative display may be provided adjacent to the first region.

According to the present invention, the display device for the hybrid vehicle is provided with the third region between the first region indicating the first mode in which the traveling is performed using the electric motor by the stop of the internal combustion engine and the second region indicating the second mode in which the traveling is performed by the start of the internal combustion engine, and the first region and the second region are divided from each other by the third region, whereby the driver can easily understand that the first region and the second region are meters indicating different traveling outputs with the third region as a boundary. As a result, it is possible to easily grasp the traveling state of the vehicle.

The present invention is suitable as a display device for a hybrid vehicle including a motor and an engine.

What is claimed is:

1. A display device for a hybrid vehicle for displaying an output relating to traveling of the hybrid vehicle, comprising:
    a first region indicating the output in a first mode in which an internal combustion engine is stopped and the vehicle travels using an electric motor;
    a second region indicating the output in a second mode in which the internal combustion engine is operated to travel; and
    a third region that is provided between the first region and the second region and has a display type different from that of the first region and the second region, the third region separating opposing ends of the first region and the second region by a predetermined constant distance greater than zero.

2. The display device according to claim 1, wherein the third region is a blank region.

3. The display device according to claim 2, wherein the third region has no scale.

4. The display device according to claim 1, wherein the second region includes a plurality of main scales and a plurality of sub scales provided between the main scales adjacent to each other,
    the sub scales have a displaying configuration different from a displaying configuration of the main scales, and
    the width of the third region is different from a width of one span of the main scale in the second region.

5. The display device according to claim 4, wherein the displaying configuration is at least one of a thickness of line, a length of line and a color.

6. The display device according to claim 4, wherein the width of the third region is narrower than the width of one span of the main scale in the second region.

7. The display device according to claim 1, wherein a display region including the first region, the second region, and the third region has a circular shape,
    the first region, the second region, and the third region are disposed in a fan shape or an arc shape, and
    the third region is disposed within a range of 45° in a circumferential direction from an uppermost position of the display region.

8. The display device according to claim 1, wherein the first region includes a fourth region positioned close to the third region and indicating the output at which the internal combustion engine possibly starts up.

9. The display device according to claim 8, wherein the fourth region has a predetermined width in a circumferential direction, and the predetermined width corresponds to a range of the output at which the internal combustion engine possibly starts up.

10. The display device according to claim 8, wherein a width in a circumferential direction of the third region is narrower than a width in a circumferential direction of the fourth region.

* * * * *